US011340194B2

(12) United States Patent
Zuberi

(10) Patent No.: US 11,340,194 B2
(45) Date of Patent: May 24, 2022

(54) METHOD FOR DETECTING MOISTURE ON A ROAD SURFACE

(71) Applicant: HELLA GmbH & Co. KGaA, Lippstadt (DE)

(72) Inventor: Adil Murtaza Zuberi, Bremen (DE)

(73) Assignee: HELLA GMBH & CO. KGAA, Lippstadt (DE)

( * ) Notice: Subject to any disclaimer, the term of this patent is extended or adjusted under 35 U.S.C. 154(b) by 793 days.

(21) Appl. No.: 16/152,168

(22) Filed: Oct. 4, 2018

(65) Prior Publication Data
US 2019/0101509 A1 Apr. 4, 2019

(30) Foreign Application Priority Data
Oct. 4, 2017 (DE) .................... 10 2017 122 979.5

(51) Int. Cl.
| | |
|---|---|
| *G01N 29/42* | (2006.01) |
| *G01N 29/036* | (2006.01) |
| *G01N 29/11* | (2006.01) |
| *G01N 29/14* | (2006.01) |
| *G01N 29/46* | (2006.01) |

(52) U.S. Cl.
CPC ........... *G01N 29/036* (2013.01); *G01N 29/11* (2013.01); *G01N 29/14* (2013.01); *G01N 29/42* (2013.01); *G01N 29/46* (2013.01); *G01N 2291/02845* (2013.01)

(58) Field of Classification Search
CPC ........................................... G01N 2291/02845
See application file for complete search history.

(56) References Cited

U.S. PATENT DOCUMENTS

| 6,954,146 B2 | 10/2005 | Bhagavathula et al. |
| 2004/0212516 A1 | 10/2004 | Bhagavathula et al. |
| 2016/0349219 A1* | 12/2016 | Paturle .................... B60C 23/06 |

FOREIGN PATENT DOCUMENTS

| DE | 4 213 221 C2 | 10/1993 |
| DE | 102 59 979 A1 | 7/2004 |
| JP | H06- 174 543 A | 6/1994 |

* cited by examiner

*Primary Examiner* — Lisa M Caputo
*Assistant Examiner* — Alex T Devito
(74) *Attorney, Agent, or Firm* — Muncy, Geissler, Olds & Lowe, PC

(57) ABSTRACT

In a method for detecting moisture on a road surface used by a vehicle, wherein at least one acoustic signal resulting from the moisture on the road surface is captured by at least one sensor device arranged on said vehicle, and wherein the captured acoustic signal is analysed via at least one analyser associated with said vehicle, it is provided according to the invention that at least one energy value of at least one signal portion of the captured acoustic signal is calculated for the analysis, that the effective value of the at least one signal portion is calculated, that a shape factor of the at least one signal portion is calculated from the quotient of the effective value and the energy value, that the minimum of the energy value in the at least one signal portion is calculated, that the maximum of the shape factor in the at least one signal portion is determined, that a quotient of the minimum of the energy value and the maximum of the shape factor is created and that said quotient is associated with a degree of wetness of the road surface.

7 Claims, 2 Drawing Sheets

METHOD FOR DETECTING MOISTURE ON A ROAD SURFACE

BACKGROUND OF THE INVENTION

Field of the Invention

The invention relates to a method for detecting moisture on a road surface, wherein at least one sound signal caused by the moisture on said road surface is captured by at least one sensor device, and wherein the captured sound signal is analysed via at least one evaluation device.

Brief Discussion of the Related Art

Methods for detecting moisture or wetness on a road surface are known particularly in the automotive sector. The detection of a degree of wetting of a road surface specifically is required to issue alerts to the vehicle user, such as regarding the risk of aquaplaning. Furthermore, vehicle safety systems can be pre-conditioned by analysing the degree of wetting of the road surface to facilitate a faster triggering of the vehicle safety systems.

Sound sensors, in particular structure borne sound sensors, are an example of sensors that can be used for detecting the moisture on a road surface. Specifically, structure borne sound sensors are arranged in the area of the vehicle's wheels in this context. The structure borne sound sensors can capture structure borne sound signals created when the water spray dispersed by the wheels on a moist road surface impacts the exterior surface of the vehicle.

For example, a method for detecting wetting of a road surface is known from DE 4 213 221 C2. In this method, the spray noise or the rolling noise of at least one wheel of the motor vehicle is captured via a transducer arranged on the motor vehicle and an output signal corresponding to the captured noise is created. A frequency range characteristic for the wetting of the road surface is segregated via bandpass filtering of the output signal. A value corresponding to the filtered output signal is formed, which is associated with a degree of wetting of the road surface.

In the known methods, frequency filters are used to remove environmental sound signals, such as those caused by impacts from objects on the vehicle's exterior surface, for example by gravel hitting the vehicle, from the frequency range to be analysed. The energy of the signal is reduced by filtering the signals to be analysed. This makes it more difficult to detect low degrees of wetting of the road surface, as a small volume of spray on the exterior surface of the vehicle creates a signal with low energy. Furthermore, the frequencies of the structure borne sound signals caused by dispersed moisture do not inevitably lie in different frequency ranges than the structure borne sound signals created by objects impacting the vehicle.

SUMMARY OF THE INVENTION

The technical problem underlying the invention is to propose a method for detecting moisture on a road surface, which makes it possible to reliably detect even minor degrees of wetting of the road surface.

The problem is solved by a method according to the claims. Further developments and advantageous embodiments are described in the dependent claims.

In a method for detecting moisture on a road surface used by a vehicle, wherein at least one sound signal resulting from the moisture on the road surface is captured by at least one sensor device arranged on said vehicle, and wherein the captured sound signal is analysed via at least one analyser associated with said vehicle, it is provided according to the invention that at least one energy value of at least one signal portion of the captured sound signal is calculated for the analysis, that the effective value of the at least one signal portion is calculated, that a shape factor of the at least one signal portion is calculated from the quotient of the effective value and the energy value, that the minimum of the energy value in the at least one signal portion is calculated, that the maximum of the shape factor in the at least one signal portion is determined, that a quotient of the minimum of the energy value and the maximum of the shape factor is formed and that said quotient is assigned with a degree of wetting of the road surface.

A sound signal caused by the moisture on the road surface is captured via a sensor device such as a sound sensor. In particular, the sound signal can be a structure borne sound signal, which is captured via a structure borne sound sensor arranged on the vehicle. For example, the structure borne sound signal can be caused when the water spray dispersed by the wheels impacts the exterior surface of the vehicle. The captured structure borne sound signal is analysed by an analyser such as a vehicle computer or a similar device. At least one energy value of at least one signal portion, in particular of a signal interval of the captured sound signal, will be calculated for the analysis. The signal portion could also be a measuring point. The energy value of the signal can be calculated from the average absolute deviation of the signal interval, for example. In particular, the average absolute deviation AvgAbs can be calculated with the formula $$AvgAbs = \frac{\sum_{n=1}^{N} |x(n)|}{N}.$$

Wherein N indicates the interval length. In particular, a sound signal such as a structure borne sound signal resulting from water spray impacting the exterior surface of the vehicle comprises higher energy levels than does a sound signal caused by vehicle operation on a dry road surface.

Changes in the signal form can be taken into account with the shape factor. In particular, changes in the signal form result from spontaneous events such as impacts of objects on the exterior surface of the vehicle, in particular gravel hitting the vehicle. During a continuous stream of water spray onto the exterior surface of the vehicle such as during operation on a road surface wet from rain or on consistently dry road surfaces, the shape factor of the sound signal stays consistently low. However, the shape factor of sound signals during spontaneous events, such as gravel hitting the vehicle, comprises higher values than that of sound signals caused by normal operation on wet or dry road surfaces. Due to the consistently positive value of the shape factor, interfering noises, such as those caused by airflow or similar interfering structure borne sound sources, can be segregated from the signal to be evaluated. Furthermore, the changes in the shape factor during changing conditions can serve to filter out spontaneous events. To calculate the shape factor, an effective value RMS first is calculated for at least one signal portion. For example, the effective value can be calculated using the following formula:

$$RMS = \sqrt{\frac{\sum_{n=1}^{N} x(n)^2}{N}}$$

The shape factor is calculated by creating the quotient of the effective value of the signal interval and the average absolute deviation. Thus, the shape factor ShapeFac results in:

$$ShapeFac = \frac{RMS}{AvgAbs}$$

For example, for filtering or reducing a structure borne sound signal caused by a spontaneous event, a maximum value of the shape factor for a time interval can be determined. A minimum value of the energy value, that is, the average absolute deviation, is determined for the same time interval. The quotient of the minimum value of the energy value, that is, of the average absolute deviation, and the shape factor leads to a resulting signal, which is suppressed to a greater degree in the case of spontaneous events such as impacts on the exterior surface of the vehicle than it is during normal vehicle operation. The resulting signal follows from the quotient $$\frac{Min\left\{\begin{array}{c}N\\n=1\end{array} AvgAbs(n)\right\}}{Max\left\{\begin{array}{c}N\\n=1\end{array} ShapeFac(n)\right\}}$$

The reduction or suppression of the structure borne sound signals caused by spontaneous events results in a higher signal-to-noise ratio, which leads to a higher resolution for the detection of degrees of wetting of the road surface. Creating the quotient has no negative effect on the detection of an structure borne sound signal caused by moisture, as the average absolute deviation of the signal always has a value greater than that of the shape factor of the signal, as the signal to be evaluated is not subject to abrupt fluctuations. The quotients can be associated with varying degrees of wetness of the road surface, that is, degrees of wetting of the road surface with a liquid, which can be stored in the analyser, for example. The current degree of wetting of the road surface can be ascertained by comparing the assessed quotient with the stored values. In this context, quotients could be stored indicating various degrees of wetness, for example, from a slightly moist road surface to a very wet road surface. The analytic process thereby facilitates a suppression of signal portions, which are caused by spontaneous events, such as gravel hitting the exterior of the vehicle, without needing to completely filter out the frequency ranges associated with spontaneously occurring events from the structure borne sound signal to be evaluated.

Furthermore, the velocity of the vehicle can be captured and taken into account for the analysis of the structure borne sound signals. In particular, the energy of the captured structure borne sound signal can depend on the velocity of the vehicle. For example, the water spray dispersed by the vehicle's tyres on a wetted road surface at a higher velocity may impact the exterior of the vehicle with greater energy, and thereby cause a structure borne sound signal with greater energy, than would the water spray dispersed at a lower velocity. Furthermore, the noise portion of a signal, which is caused by vibrations during driving operations, for example, may be more pronounced at higher velocities than the noise portion at a lower velocity would be. Capturing the vehicle velocity allows using the velocity values to verify the plausibility of the degree of wetting of the road surface.

In one further development of the method, the energy value is calculated via the average absolute deviation of the signal. The average absolute deviation facilitates a simple calculation of the energy of the signal, in particular of the captured structure borne sound signal. In particular in the case of road surfaces wet from rain, the signal recorded by the structure borne sound sensor shows a higher level of energy than it does during driving operation on a dry road surface. Thus, it is possible to distinguish between a wetted and a dry road surface. An energy value indicating the energy level of the signal can be calculated via the average absolute deviation.

In a further development of the invention, a time interval to be evaluated is selected from the captured sound signal. Selecting a time interval makes it possible to examine specific signal portions, which result from spontaneous events such as gravel hitting the exterior surface of the vehicle or are caused by moisture on the road surface, for example.

In a further development of the invention, the sound signal is a structure borne sound signal. Capturing the structure borne sound signal via structure borne sound sensors, in particular in an area of the exterior surface of the vehicle, onto which water spray is dispersed by the tyres, facilitates the easy detection of moisture on a road surface used by the vehicle.

In a further development of the invention, the captured sound signal is filtered via a high-pass filter prior to the calculation of the energy values. The high-pass filter suppresses frequency portions of a captured signal, which lie below a cut-off frequency. For example, frequency portions can be suppressed, which are caused by vibrations resulting from the air stream or other vibrations associated with driving operations. This facilitates the analysis of the frequency portions, which are caused by the impact of water spray.

In one further development of the invention, the high-pass filtered signal is scaled. Scaling the signal facilitates the analysis of the captured signal, for example by increasing the energy resolution.

In a further development of the invention, the cut-off frequency of the high-pass filter is adjusted to correspond to the frequency range of expected interference frequencies. High-pass filtering the captured sound signal makes it possible to filter out frequency ranges, which result from vibrations that may occur during normal driving operations, for example. Filtering out the interfering noise prevents any negative effects of the frequency range of the interfering noise on the moisture detection. The cut-off frequency, below which frequency portions of the signal are suppressed, can be adjusted to the expected interfering noises.

BRIEF DESCRIPTION OF THE DRAWINGS

An exemplary embodiment of the invention, which illustrates further inventive characteristics, is shown in the drawings.

DETAILED DESCRIPTION OF THE PREFERRED EMBODIMENTS

Figure 1:
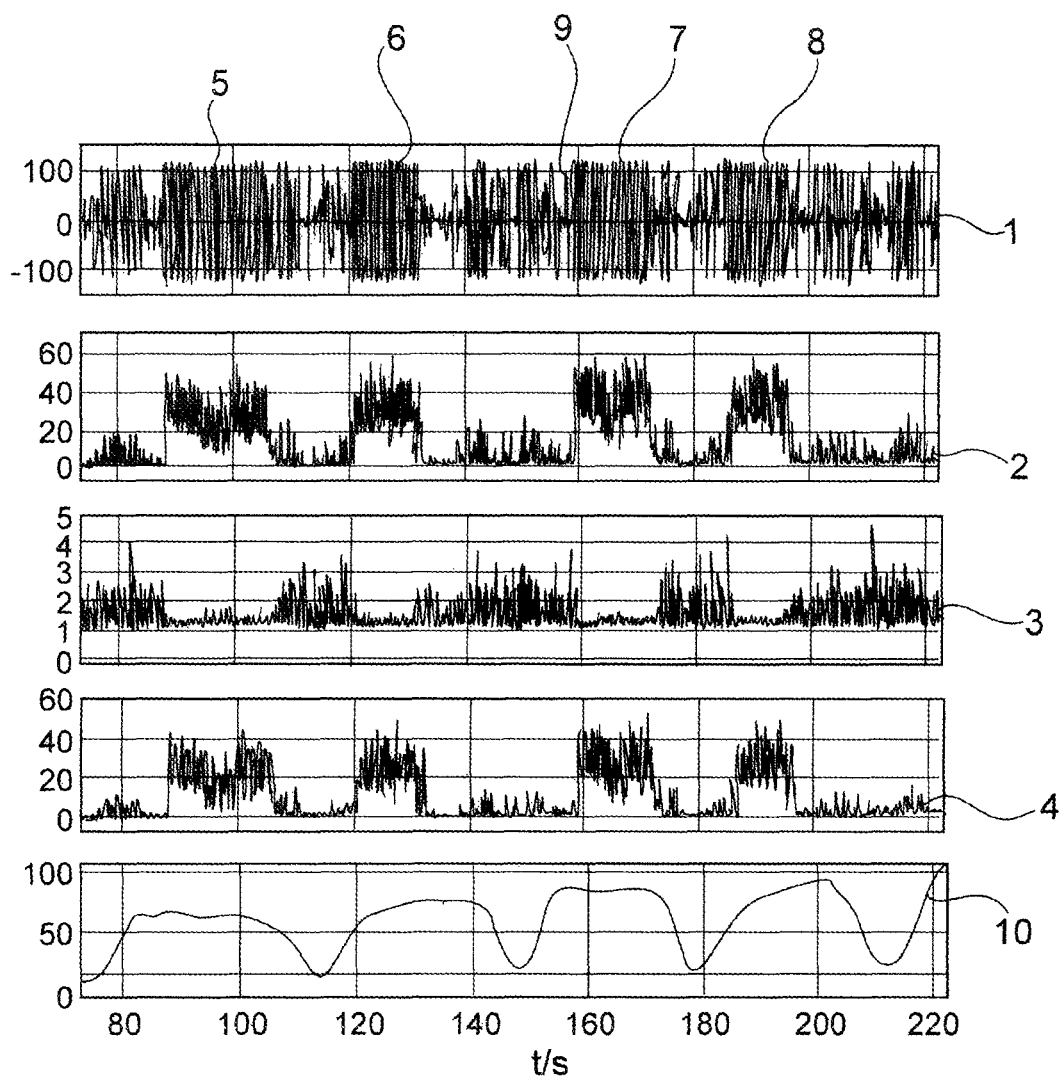
FIG. 1 shows a structure borne sound signal recorded during driving operations of a motor vehicle across four wet areas; also shown are the analytic steps.

FIG. 1 shows an example of a structure borne sound signal 1 recorded via an structure borne sound sensor during the driving operation of a motor vehicle on a road surface with four separate wet areas, that is, areas wetted with moisture. The amplitude of the structure borne sound signal 1 is represented on the x-axis; the time is plotted on the y-axis. The analysis can be performed with an analogue-digital-converter, for example, wherein the signal is scaled to a maximum of the display capability of the analogue-digital-converter. The sampling rate of the analogue-digital-converter could be 8,000 measuring points per second, for example, such that a 4 kHz signal can be represented. The cut-off frequency of the high-pass filter is 2 kHz. The recorded structure borne sound signal 1 in FIG. 1 is filtered via a high-pass filter and scaled, for example via an analyser. This makes it possible to focus the examination on the frequency range of the structure borne sound signals caused by the impact of water spray; vibrations caused by the acceleration of the vehicle or by the air stream, for example, are filtered out of the structure borne sound signal 1 to be examined. The average absolute deviation 2 of the signal is calculated from the filtered and scaled structure borne sound signal 1. Furthermore, the shape factor 3 is calculated from the quotient of the effective value and the average absolute deviation 2. The quotient of the minimum of the average absolute deviation in a time interval and the maximum of the shape factor in the time intervals are used to calculate a resulting signal 4. The structure borne sound signal 1 clearly represents four wetness areas on the road surface in the intervals 5 to 8. In these areas 5 to 8, the structure borne sound signal 1 displays the greatest energy, that is, the greatest amplitude. This also is evident in the energy value in signal 2, which was calculated from the average absolute deviation. Due to the consistency of signal 1 in the signal portions 5 to 8, which were caused by water spray impacting the exterior surface of the vehicle while driving through wet areas, the calculated shape factor 3 is consistently small in these areas 5 to 8. The resulting signal 4 shows regions of increased amplitude in the areas 5 to 8, which resulted from wetness on the road surface. The amplitude of the resulting signal 4 can be associated with a previously defined degree of wetting of the road surface. Furthermore, the time-dependent velocity 10 of the motor vehicle is represented.

Figure 2:
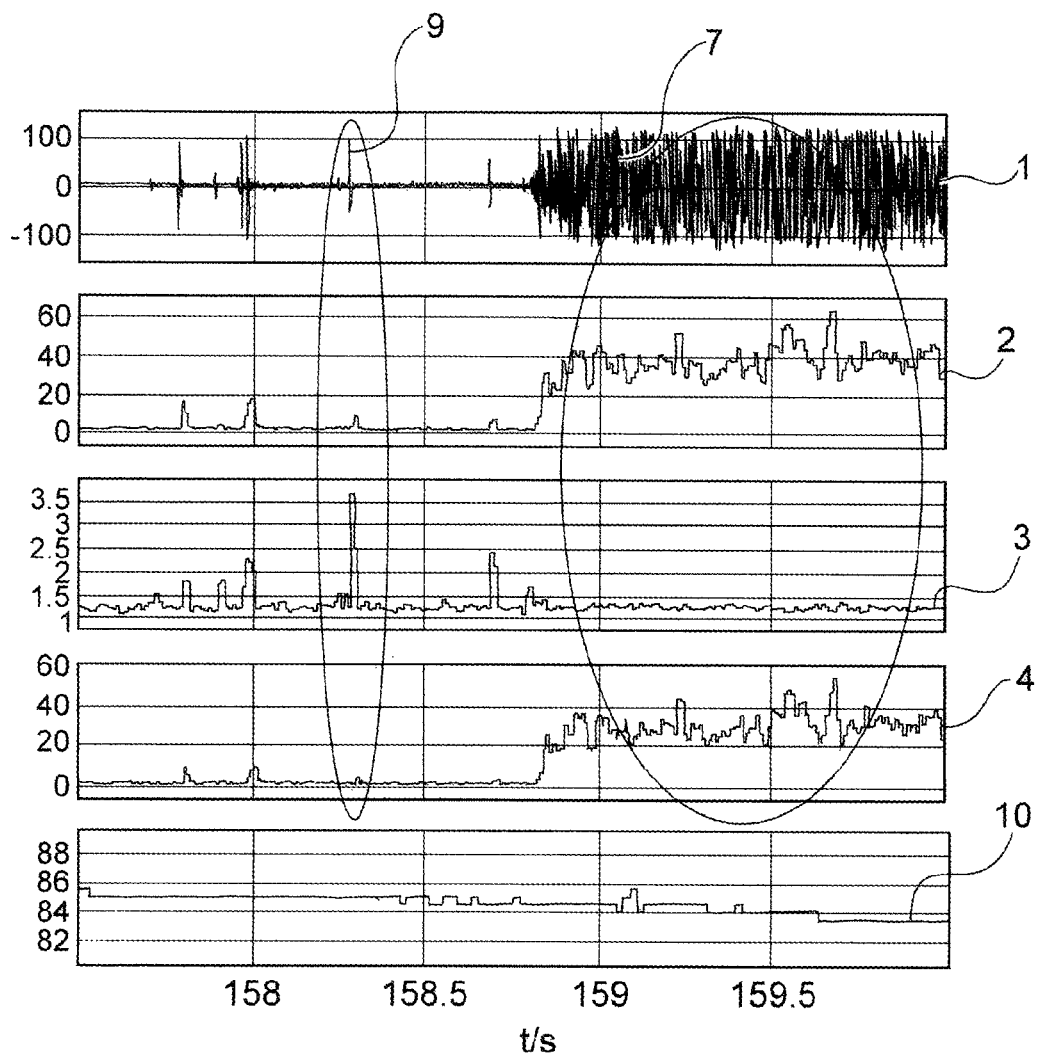
FIG. 2 shows a time interval excerpted from the representation according to FIG. 1.

FIG. 2 shows a time interval excerpted from the time interval shown in FIG. 1, which has been magnified for better illustration. The excerpt of signal 1 shows signals recorded while driving through a dry and a wetted road surface area. Alongside structure borne sound signals 7 caused by the impact of moisture, are peaks 9 of structure borne sound signals caused by the impact of objects onto the exterior surface of the vehicle, such as gravel hitting the vehicle. The structure borne sound signal caused by a spontaneous event is clearly visible as peak 9 with limited duration in signal 1. The representation of the average absolute deviation 2 shows peak 9 with low amplitude, due to the creation of the quotient with the interval length in its denominator. The representation of shape factor 3 shows peak 9 with an increased amplitude, because the shape factor reacts to changes in the form of the signal, due to the fact that the shape factor is created from the quotient of the effective value and the average absolute deviation. Peak 9 has a much higher value of its shape factor than does region 7, which resulted from water spray. The calculation of the resulting signal 4, which is used to determine the degree of wetness of the road surface, results in the suppression of peak 9, which was caused by a spontaneous event, by creating the quotient of the minimum of the average absolute deviation and the maximum of the shape factor in the time interval. The calculation of the resulting signal 4 therefore made it possible to suppress the structure borne sound signals resulting from spontaneous events, which means a more-accurate determination of the degrees of wetting of the road surface. Furthermore, the time-dependent velocity 10 of the motor vehicle is shown.

All characteristics listed in the specifications above and in the claims can be combined arbitrarily with the characteristics of the independent claim. The disclosure of the invention therefore is not limited to the specified or claimed combinations of characteristics; rather, all sensible combinations of characteristics in the context of the invention should be considered disclosed.

The invention claimed is:

1. A method for detecting moisture on a road surface used by a vehicle, comprising:
    arranging at least one sensor device on the vehicle;
    the at least one sensor device capturing at least one sound signal resulting from the moisture on said road surface;
    associating at least one evaluation device with the vehicle; and
    the at least one evaluation device analysing the captured sound signal,
    wherein:
    at least one energy value of at least two signal portions of the captured sound signal is calculated for the analysis,
    at least one effective value of the at least two signal portions is calculated,
    at least one shape factor of the at least two signal portions is calculated from a quotient of the at least one effective value and the at least one energy value,
    a minimum of the at least one energy value in at least two signal portions is calculated,
    a maximum of the at least one shape factor in the at least two signal portions is determined,
    that a quotient of the minimum of the at least one energy value and the maximum of the at least one shape factor is formed and
    that said quotient of the minimum of the at least one energy value and the maximum of the at least one shape factor is assigned with a degree of wetness of the road surface.

2. The method according to claim 1, wherein the energy value is calculated from an average absolute deviation of the signal.

3. The method according to claim 1, wherein at least one time interval to be analysed is selected from the captured sound signal.

4. The method according to claim 1, wherein the sound signal is a structure borne sound signal.

5. The method according to claim 1, wherein the captured sound signal is filtered via a high-pass filter prior to calculating the energy value.

6. The method according to claim 5, wherein the high-pass filtered signal is scaled.

7. The method according to claim 5, wherein a cut-off frequency of the high-pass filter is adjusted to suit a frequency range of an expected interference frequencies.

* * * * *